US012752277B2

(12) United States Patent
Love et al.

(10) Patent No.: US 12,752,277 B2
(45) Date of Patent: Oct. 6, 2026

(54) BRACKET

(71) Applicants: RANDOX LABORATORIES LTD, Crumlin (GB); Randox Teoranta, Dungloe (IE)

(72) Inventors: Dale Love, Crumlin (GB); Peter Fitzgerald, Crumlin (GB); Ivan McConnell, Crumlin (GB); Christina McFadden, Dungloe (IE)

(73) Assignee: RANDOX LABORATORIES LTD, Crumlin (GB)

( * ) Notice: Subject to any disclaimer, the term of this patent is extended or adjusted under 35 U.S.C. 154(b) by 571 days.

(21) Appl. No.: 18/273,737

(22) PCT Filed: Jan. 21, 2022

(86) PCT No.: PCT/GB2022/050169

§ 371 (c)(1),
(2) Date: Jul. 21, 2023

(87) PCT Pub. No.: WO2022/157504

PCT Pub. Date: Jul. 28, 2022

(65) Prior Publication Data

US 2024/0091783 A1 Mar. 21, 2024

(30) Foreign Application Priority Data

Jan. 22, 2021 (GB) ..................................... 2100887

(51) Int. Cl.
*B01L 9/00* (2006.01)

(52) U.S. Cl.
CPC ......... *B01L 9/523* (2013.01); *B01L 2200/025* (2013.01)

(58) Field of Classification Search
CPC ...... B01L 9/523; B01L 2200/025; B01L 9/50; B01L 2200/02; B01L 9/00; B01L 9/52; B01L 2300/0829; G01N 35/028; G01N 21/01
See application file for complete search history.

(56) References Cited

U.S. PATENT DOCUMENTS

| | | | | |
|---|---|---|---|---|
| 4,282,182 A * | 8/1981 | Webster | ................... | G01N 1/10 422/50 |
| 2004/0114227 A1 | 6/2004 | Henderson et al. | | |
| 2012/0002276 A1 | 1/2012 | Suzuki et al. | | |
| 2018/0003940 A1 | 1/2018 | Quarre et al. | | |

OTHER PUBLICATIONS

May 2, 2022—International Search Report & Written Opinion—App. No. PCT/GB2022/050169.

* cited by examiner

*Primary Examiner* — Brian J. Sines
(74) *Attorney, Agent, or Firm* — Banner & Witcoff, Ltd.

(57) ABSTRACT

There is provided a bracket for a biological sample analyser. The bracket comprises abase and an arm extending from the base, the base being engageable with a platform of a biological sample analyser, wherein, when the base is engaged with the platform, the arm extends into a sample plate bay of the biological sample analyser prohibiting access to a portion of the bay. The arm thereby limits misalignment of a sample plate in the bay by blocking access to a portion of the bay only required when the sample plate is loaded into the bay in an incorrect orientation. A biological sample analyser comprising a bay in which a sample plate is loadable in use and the bracket is also provided.

17 Claims, 6 Drawing Sheets

BRACKET

CROSS-REFERENCE TO RELATED APPLICATIONS

This application is a U.S. National Stage application under 35 U.S.C. § 371 of International Application PCT/GB2022/050169 (published as WO 2022/157504 A1), filed Jan. 21, 2022, which claims the benefit of priority to United Kingdom Patent Application No. 2100887.5, filed Jan. 22, 2021. Benefit of the filing date of each of these prior applications is hereby claimed. Each of these prior applications is hereby incorporated by reference in its entirety.

FIELD OF INVENTION

The present invention relates to mounts for microplates and associated accessories typically used with purification or extraction instruments and analysers for biological samples.

BACKGROUND

Analysis of biological samples to identify constituents of samples is important for a number of medical and biological tests. This includes extraction or purification of DNA, RNA, protein and cells for diagnostic testing.

In order to allow repeatable and reliable processing of multiple biological samples machines, commonly referred to as analysers, have been developed. These provide an automated system for carrying out the necessary extraction and purification steps of a biological assay used for, or as part of, the testing of biological samples.

There are steps in assays where it is important that a sample or reagent is in a known location to ensure sample processing is carried out correctly. These steps are typically the extraction and elution steps, but can include other steps.

In order to provide a sample in the correct location, samples are placed into sample plates, also referred to as microplates. The plates have a regular arrangement of wells into which samples are able to be placed during processing.

It is important the microplates are loaded into an analyser in the correct orientation. If this does not happen, samples will not be processed properly due to being in the wrong location.

To avoid a microplate being loaded into an analyser in the wrong orientation, microplates typically have labelling visible to a user. This allows the user to check the labelling is the correct way round when the microplate is loaded into the analyser.

Additionally microplates frequently have orientation markers to provide a further visual indicator to the user of the correct orientation of the plate. These markers are typically provided by one or more chamfered corners on the plate.

There are occasions however where both these indicators are not enough to avoid a microplate being loaded into an analyser in the wrong orientation. This is because of human error when loading the microplate into an analyser.

These errors are most noticeable when high volumes of samples are being processed. Such volume quantities can be in excess of 1,600 microplates being processed in analysers in a 24 hour period, which provides ample opportunity for human error during loading of a microplate into an analyser.

At the time of filing, this quantity of microplates is being processed at a single UK laboratory alone to detect the Sars-Cov-2 coronavirus. Due to the volume of Covid-19 testing being conducted, and whenever high volumes of samples are tested, it is very important to avoid delays caused by samples having to be re analysed if an error is made.

In addition to avoiding delays, there are often critical reasons to avoid these errors. Such reasons include limited sample volumes being available, meaning that any error would require further samples to be collected.

A means of reducing errors in the orientation of microplates being placed in an analyser is therefore needed.

SUMMARY OF INVENTION

According to a first aspect, there is provided a bracket for (i.e. suitable for) a biological sample analyser, the bracket comprising: a base and an arm extending from the base, the base being engageable with a platform of a biological sample analyser, wherein, when the base is engaged with the platform, the arm extends into a sample plate bay of the biological sample analyser prohibiting access to a portion of the bay. The arm thereby limits misalignment of a sample plate in the bay by blocking access to a portion of the bay only required when the sample plate is loaded into the bay in an incorrect orientation.

This introduces a physical check and error inhibitor over and above the existing visual checks a user is able to conduct when loading a microplate into an analyser. This significantly reduces the likelihood of a user mounting a microplate in an analyser in the incorrect orientation. This is because the microplate will not fit properly in the bay into which it is being loaded if it is orientated incorrectly.

As such, unless the microplate is loaded in the correct orientation, the bracket physically prohibits the microplate being loaded into the bay fully. This is due to the arm extending into the bay and blocking access to a part of the bay that would need to be accessed by the microplate when loaded in the wrong orientation due to the shape of the microplate. We have found this significantly reduces the chance of human error causing incorrect orientation of a microplate in an analyser. This is achievable due to the relative orientation of the base and arm and the base being engaged at a side of the bay when engaged with the platform.

Additionally, this mechanical implementation of this functionality is relatively low cost. The simplicity of the implementation also allows this functionality to be provided without making the analyser significantly more technically complex when the bracket is engaged with the analyser.

There can of course be a plurality of arms, each extending into a portion of the bay when the base is engaged with the platform. Such an arrangement may be implemented should the shape of the microplate being used with the analyser warrant additional arms in order to provide the physical prohibition of the microplate being orientated incorrectly.

The (or each) arm may provide a surface with which (one or more) orientation markers of a sample plate are able to be aligned when loading the sample plate into the sample plate bay. This surface may be complementary to the surface of the sample plate that is aligned with the surface provided by the arm.

The arm providing a surface allows a user to slide a microplate into the analyser bay and engage the plate with the surface as a physical confirmation the plate has been mounted in the correct orientation. Instead of providing a surface, other shapes could be used, such as a pin or edge. These would not provide a complementary surface however, but could allow a form of interlocking between the microplate and bracket.

The arm may include a section orientated at an angle relative to the base. The angle may be a 45 degree (°) angle, but can be other angles. The angle provides a complementary shape to the shape of the closest part of the microplate when the plate is loaded correctly into the analyser. This also allows the base to be located outside of the bay while still allowing the bracket to fulfil its function.

The bracket may further comprise a first transitional surface at a join between a side of the arm and the base. This provides a means of reducing stress within the material of the bracket by reducing the angle at the join between the arm and base.

The first transitional surface may be a chamfer. While other shapes could be used, such as a fillet, since this surface is quite exposed during use of the bracket, using a chamfer encourages anything that falls on to the surface to roll or flow off and also provides a surface without contours to make cleaning of the surface easier.

At least a portion of the arm may extend outwardly from the base providing an overhang. This portion may provide the surface referred to above and/or the section orientated at an angle relative to the base. Providing an overhang allows a part of a microplate to be slid underneath the arm avoiding making loading of such a plate more difficult while still allowing the bracket to perform its function.

The bracket may further comprise a second transitional surface at a join between an underside of the overhang and the base. As with the first transitional surface, this provides a means of reducing stress within the material of the bracket by reducing the angle at the join between the arm and base.

The second transitional surface may be a (concave) fillet. While other shapes could be used, such as a chamfer, using a fillet at the join of the underside of the overhang and the base simplifies cleaning. This is because access to the side of the base at the join is not limited by reducing space as the proximity to the base increases.

The bracket may be made of acetal (also known as polyoxymethylene). Other materials are able to be used, such as PTFE or aluminium. However, polymers are typically a preferred material and acetal is low cost (compared to PTFE for example) and is compatible with the needed level of non-magnetic and cleaning resistance for use inside an analyser. Ethanol is commonly used to ensure contamination is removed and suitable cleanliness levels are reached and aluminium has a lower compatibility with ethanol than acetal. Non-magnetic materials may be preferred. This is due to analysers often using strong magnets during sample processing, so using a magnetic material for the bracket would cause interference with operation of the analyser.

The base height may be at least (about) 7 millimetres (mm). Additionally or alternatively, the width of the base may be at least (about) 9 mm. These are a typical minimum height and/or width when the bracket is acetal. We have found that this height and width reduces the amount the bracket is able to deform sufficiently for a user not to be able to deform the bracket enough to allow a microplate to be loaded into the analyser bay in the incorrect orientation with the bracket in place.

The base may have at least one through-bore through which a bolt of the platform is able to pass in use. This provides a simple means of fastening the bracket to the analyser in use.

The base and the arm are preferably integral to a single piece of material. For example, the bracket may be a machined block, such as thereby being (only) a (single) unitary block, which may have been manufactured from a block of material. This allows the bracket to be fabricated by a simpler, quicker and cheaper process than other fabrication methods that could be used, such as 3D printing or moulding.

According to a second aspect, there is provided a biological sample analyser, comprising: a bay in which a sample plate is loadable in use; and a bracket according to the first aspect, the bracket having a base and an arm extending from the base, the bracket being engaged with a platform at the bay, the arm extending into the bay prohibiting access to a portion of the bay.

The bracket may be provided as part of the platform or may be fitted later.

The biological sample analyser may be any analyser used throughout the entire sequence of steps involved with processing biological samples. For example, the analyser may be an automated liquid handling machines used to prepare microplates prior to loading on to an extraction analyser. Automated liquid handling machines can be used to dispense lysis, wash and elution buffers. While correct orientation in this case may not be critical for all plates, it is beneficial for at least the lysis plate (the microplate to which a biological sample is subsequently added) and the elution plate for traceability purposes. This is even when there are no biological samples present. Alternatively, it may be required that all microplates in a liquid handling system are placed in a desired orientation.

Liquid handling systems can also be used to automate PCR setup after an extraction process, in which case correct orientation is extremely important. In view of the range of machines that we intend to represent an analyser as described herein, the analysers described herein are machines capable of taking a microplate for processing, dispensing or analysis.

The arm may extend (only) into a corner of the bay. This allows the arm to occupy a corner of the bay that would need to be occupied by a microplate when loaded into the bay if loaded in an incorrect orientation, but would not need to be occupied by the microplate when correctly loaded. As such, this provides a means for reducing human error when loading microplates into an analyser without interfering with the processing of samples by entirely blocking microplates from being loaded into the bay.

There may be a void between the arm and a base of the bay. This allows a portion of a microplate, such as a foot or flange that does not have the same shaping as an upper part of the plate (since the shaping is typically only provided as a visual indicator to a user of orientation, and so is not usually applied to a foot of a plate).

The base of the bracket may be engaged with at least one bolt projecting outwardly from the platform. This provides a simple fastening means for securely attaching the bracket to the analyser.

BRIEF DESCRIPTION OF FIGURES

Example brackets and an example analyser are described in detail below with reference to the accompanying illustrations, in which.

DETAILED DESCRIPTION

Correctly orientating a microplate in a biological sample analyser is important to maintain accuracy and reliability of extraction, purification and detection procedures and other assays run on biological samples. In order to achieve this, the likelihood of human error when inserting a microplate for samples into an analyser needs to be reduced. To achieve this we have developed a system that enhances the passive indicators provided by manufacturers to reduce these errors.

The system that has been developed stops the microplate from being able to be inserted fully into the analyser if loaded in an incorrect orientation. This is able to inhibit operation of the analyser to avoid an assay being run unless the microplate is correctly inserted into the analyser.

Figure 1:
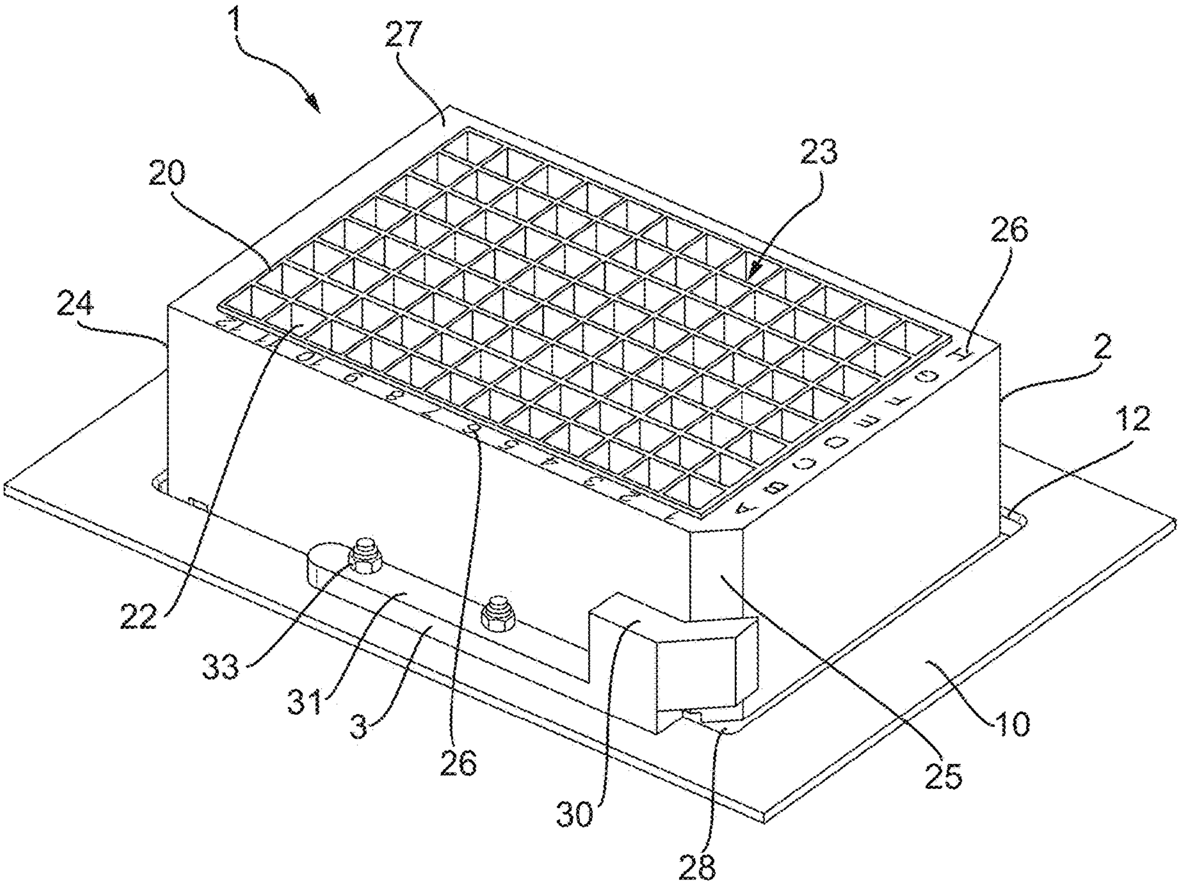
FIG. 1 shows a schematic of a portion of an example analyser and an example bracket in use.

A portion of an analyser is generally illustrated at 1 in the example shown in FIG. 1. This portion of the analyser is at least one location in an analyser where a microplate 2 is mounted to allow samples held in the microplate or in wells of or held by the microplate to be processed.

The microplate 2 shown in the figures has a plurality of wells 20. The wells each provide a vessel with a base 21 (most visible in FIGS. 3 and 4), side walls 22 and an opening 23 at an opposing end of the well to the base. This allows the vessel to hold a liquid.

In the example shown in FIG. 1, the base 21 of each well is circular and the opening 23 of each well 20 (i.e. the cross-sectional area defined within the side walls 22) is square. In other examples, the opening of each well may be a different shape, such as a circle.

The wells 20 are arranged in an array. In the example shown in FIG. 1 and the other figures the array is an array of rows and columns. The array has 96 wells, but in other examples the array may be provided with a different number of wells, such as six, 12, 24, 48, 384, 1536 or another number of wells.

The array of wells 20 is rectangular in this example and has a ratio of width to length of 2 to 3 (i.e. 2:3). This is a typical array shape and width to length ratio for microplates.

The depth of the wells 20 is determined by the height of the microplate 2. The microplate 2 shown in FIG. 1 is a deep well microplate, commonly referred to as a "block". In other examples the microplate may have shallower wells and still be compatible with the system we have developed.

The microplate 2 has external walls 24 that provide the exterior sides of the microplate. The external walls are upright, and in some examples taper inward from a base of the walls towards a top at an opposing end of the external walls. The top of the external walls is at approximately the same height as the openings 23 of the wells 20, with the base being in approximately the same plane as the base 21 of the wells.

Figure 3:
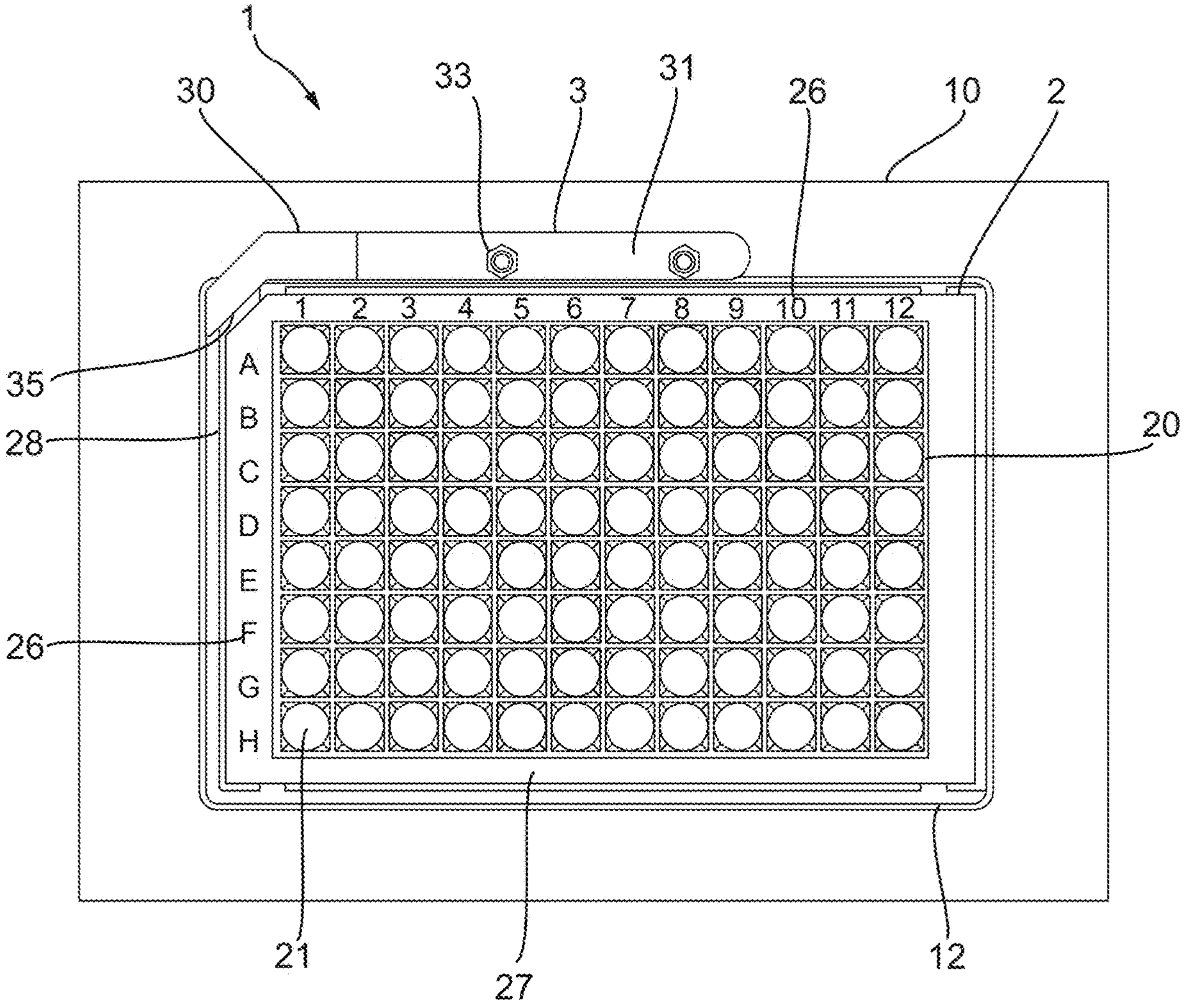
FIG. 3 shows a schematic of a portion of an example analyser and an example bracket in use with a microplate in one position.
Figure 4:
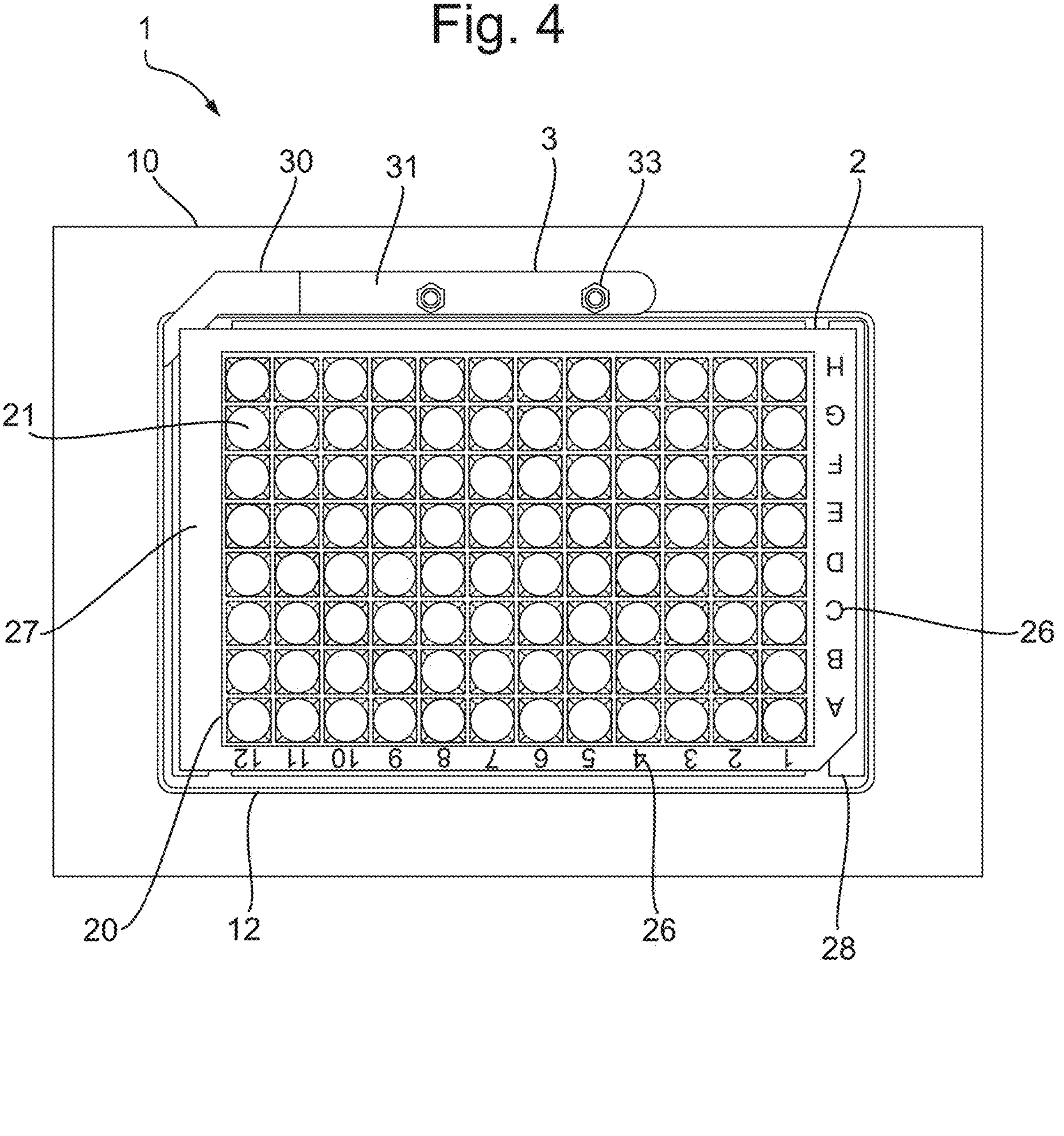
FIG. 4 shows a schematic of a portion of an example analyser and an example bracket in use with a microplate in another position.

In the example shown in FIGS. 1, 3 and 4, the external walls 24 of the microplate provide a rectangular perimeter around the array of wells 20. This perimeter provides a close match to the shape of the array with a slightly larger area than the area covered by the array.

The larger size of the perimeter area of the external walls 24 than the area covered by the array of wells 20 allows one of the corners of the rectangular perimeter to have a chamfer. This provides a chamfered, fifth, side 25 to the perimeter. In other examples more than one corner may have a chamfer.

Typically, microplates have at least one set of diagonally opposite edges with a different shape from each other. Using the example shown in FIG. 1, the chamfered side 25 and the edge (also referred to as a corner) between external walls 24 diagonally opposite to the chamfered side provide a different shape on diagonally opposite corners of the perimeter. This is one means used on microplates that allows a user to visually identify the orientation of a microplate.

A further means used on microplates to allow a user to identify the orientation of a microplate is to provide labelling 26 to identify individual rows and columns of an array of wells 20. In the example shown in FIG. 1, the labelling is provided on an upper surface 27 that extends between the openings 23 of the wells and the tops of the external walls 24.

The labelling 26 in FIG. 1 is "1" to "12" along the length of the array of wells 20 and "A" to "H" along the width of the array. Additionally, the "1" and "A" are located in the corner of the array closest to the chamfered side 25.

At a base of the external walls 24 there is a flange 28 (most easily seen in FIGS. 3 and 4). The flange extends the footprint of the microplate 2 to a slightly larger area than the area established by the perimeter of the external walls. In the example shown in FIGS. 1, 3 and 4, the flange provides a rectangular footprint with some cut-outs to allow engagement with projections (not shown), such as alignment pegs, on an analyser.

The wells 20 of the microplate 2 are filled with liquid and/or reagents (not shown) in use in order to allow processing of biological samples, such as to conduct DNA, RNA, protein or cell extraction from a sample. While this is able to be conducted manually by a user, in order to increase the processing speed and reliability of the process, an automated means of processing samples is commonly conducted.

The automated process is conducted using an analyser 1. In order for the processing to be carried out, one or more microplates need to be loaded into the analyser. To allow this the analyser is provided with a turntable or platform 10 (the turntable or platform both being referred to as a "platform" hereafter for ease of reference) with one or more bays 12 suitable for receiving a microplate 2.

In the examples shown in FIGS. 1, 3 and 4, each bay 12 is provided by a recess in the platform 10. The recess has a complementary shape to the footprint of the microplate 2. This allows a user to load each microplate into the analyser 1 by slotting a microplate into the recess of each respective bay. This also ensures the microplate has the correct alignment with the bay into which it is loaded so that it lines up with the components of the analyser that interact with the microplate during processing.

We have found that even with the means of identifying the orientation of a microplate mentioned above, users continue to load microplates into the analyser 1 in the wrong orientation. This is even with the only two available orientations being 180° rotations of each other when the microplate is slotted into the recess of a bay 12.

In order to address this issue, and to reduce human error, we have developed a bracket 3. Example brackets are shown in each of FIGS. 1 to 6.

Compared to when the bracket 3 is not present, the bracket 3 alters the shape of volume in which the microplate 2 is located when present in the bay 12. This is achieved by the bracket having an arm 30 projecting away from an end of a bar 31 that provides a base of the bracket.

When the bracket 3 is in use, the bar 31 is located at a side of a bay 12 of the analyser 1. This bar is provided by an elongate strip.

In order to fix the bracket 3 in place relative to the analyser 1, the bar 31 has two through-bores 32 passing between its upper and lower surfaces. The through-bores are aligned with fastening bolts 33 in the analyser platform 10. When the bracket is in use, the bolts pass through the bores and locknuts are fastened to the bolts to secure the bracket to the analyser.

As can be seen in FIGS. 1 and 3 to 6, when in use one end of the bar is close to one of the bolts 33 used to fasten the bar 31 to the platform 10. The bar extends past the other bolt towards a corner of the bay 12. At the end of the bar closest to the corner of the bay, the arm 30 projects upward and away from the bar.

Figure 2:
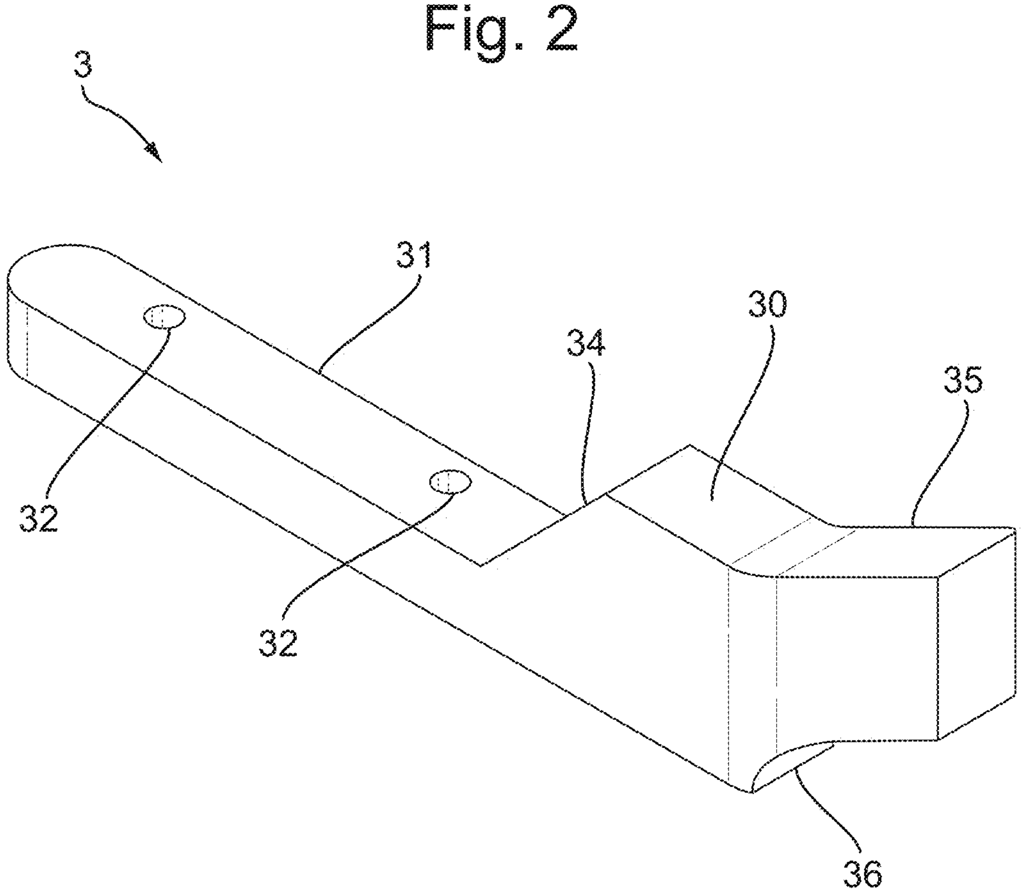
FIG. 2 shows a schematic of a further example bracket.

FIGS. 1, 3 and 4 show one example of the bracket 3, and FIG. 2 shows a second example of the bracket. In the example shown in FIGS. 1, 3 and 4, the arm 30 joins the upper surface of the bar 31 at a right angle. In the example shown in FIG. 2, the join between the arm and upper surface has a transitional surface provided by a chamfered surface 34 instead of a right angle join. The chamfered surface runs between an upper surface of the bar and an upper surface of the arm.

A portion of the arm 30 is located on top of the bar 31, and a further portion extends past the end of the bar. The underside of this portion is elevated above the lower surface of the bar providing an overhang section. The overhang section makes it easier to load the microplate 2 into the bay 12 (when being loaded in the correct orientation) by providing a void for the flange 28 of the plate to pass through and in which to fit when being slid into place.

In the example shown in FIG. 2, the join between the underside of the overhang section and the end of the bar has a further transitional surface. This is provided by a concave fillet 36. In the example shown in FIGS. 1, 3 and 4, this join is a right angle. The transitional surfaces reduce stress in the bracket 3 at these joints.

The portion of the arm 30 that extends past the end of the bar 31 projects into the bay 12. In the examples shown in the figures, this is achieved by the portion being angled at 45° to the longitudinal axis of the bar. An inner surface 35 of this portion provides an upright surface angled relative to the sides of the recess of the bay and relative to the longitudinal axis of the bar.

The inner surface 35 of the arm 30 provides a barrier that stops anything in the bay 12 occupying the space in the bay occupied by the portion of the arm and any space behind that portion towards the sides of the bay. This limits the orientation the microplate 2 can be have while loaded in the bay. This is because the microplate will only fit in the bay when the chamfered side 25 is located in this corner of the bay. While shown in FIG. 1, this can be seen most clearly from FIG. 3, which shows the inner surface of the arm and the chamfered side of the microplate providing a complementary fit with each other. As shown in FIG. 4, if the microplate is rotated through 180°, the corner of the bay where the arm portion is located needs to be occupied by the corner of the external walls 24 of the microplate. As such, the microplate does not fit in the bay.

The bar 31 of the bracket 3 has a height of about 7 mm and a width of about 9 mm. The combined height of the bar and arm 30 is about 20 mm. With the bracket this size, when loaded correctly into the bay 12, there is 5 mm clearance between the inner surface 35 of the arm and the chamfered side 25 of the microplate 2. The bracket 3 is a unitary piece of machined acetal. We have found that, when using this material, this size of bracket limits the ability for users deform the bracket. As such, a user is not able to force an incorrectly orientated microplate into the bay by deforming the bracket. The chamfered surface 34 providing the transitional surface between the arm 30 and bar 31 in the example in FIG. 2 also strengthens the bracket further.

While a suitable strength to avoid being deformed by a user, the bracket 3 has a low weight so as not to disrupt operation of the analyser 1, such as avoiding disrupting movement of the platform. The brackets shown in the figures have a weight of about 13 grams.

Figure 5:
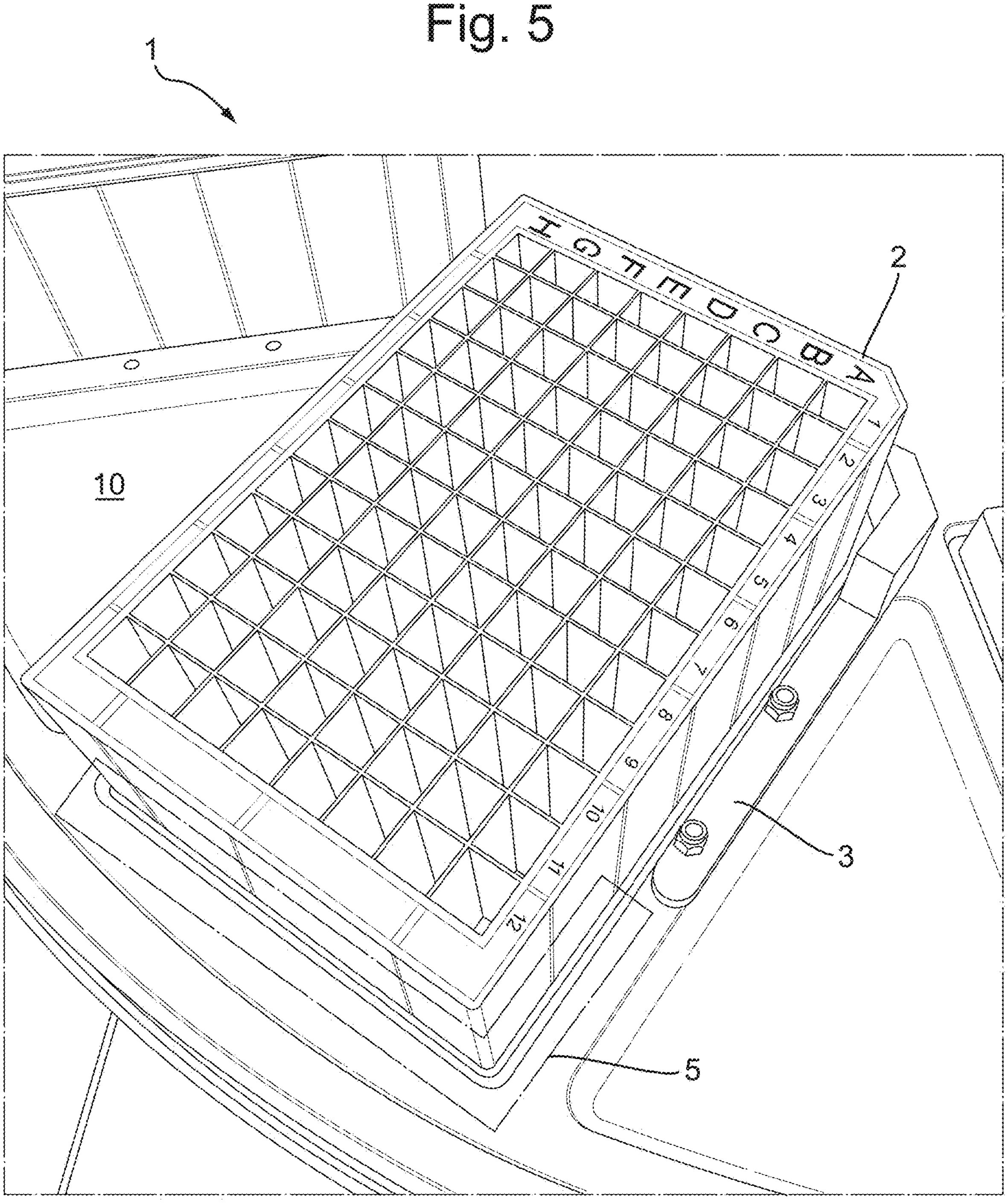
FIG. 5 shows an example analyser and example bracket with a microplate in one orientation.

As shown in FIG. 5, when the microplate 2 is loaded into the bay 12 in the correct orientation, the microplate fits in the recess of the bay as indicated at area 5 of FIG. 5. This corresponds to the orientation of the microplate 2 as shown in FIG. 3.

Figure 6:
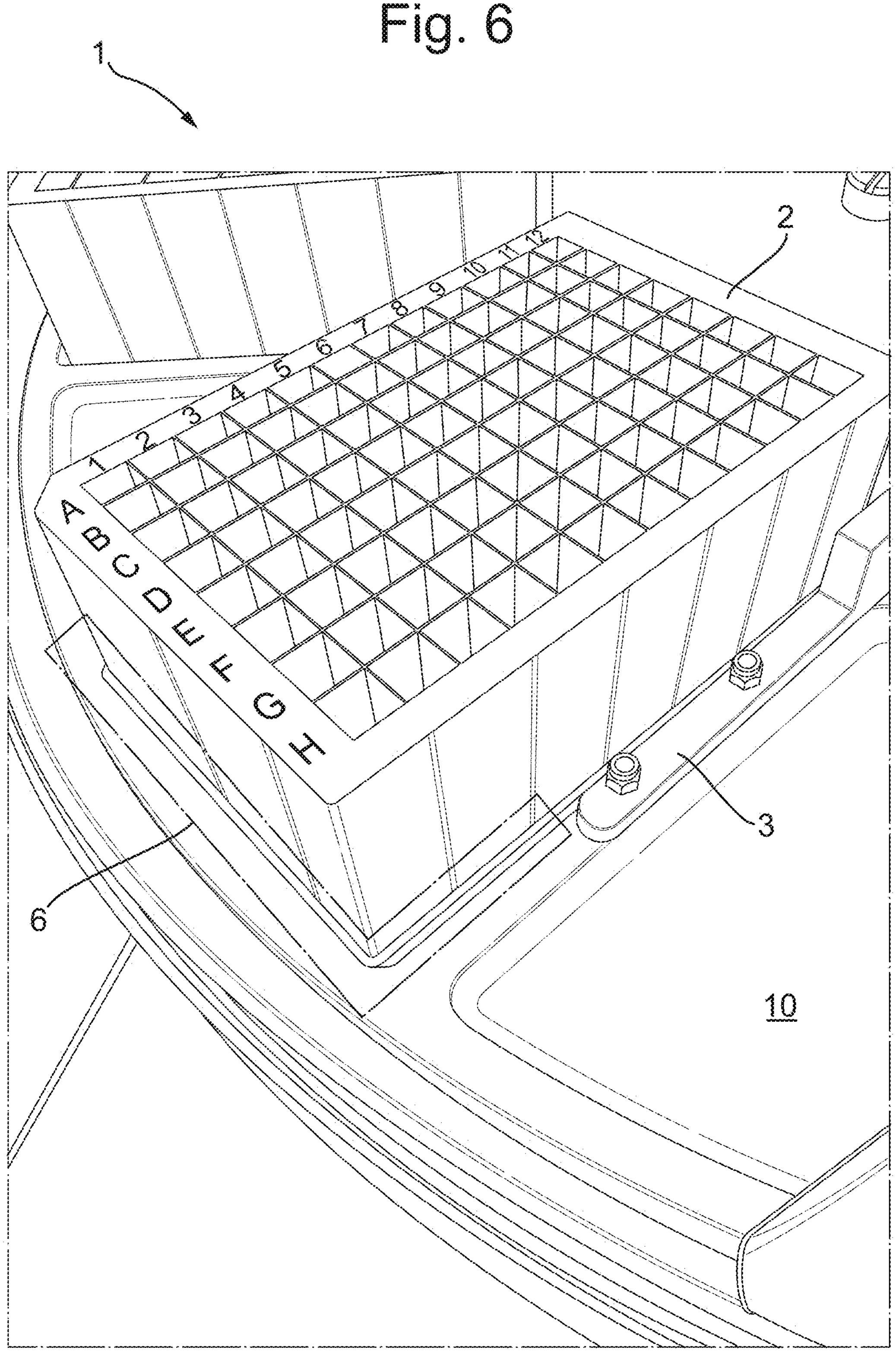
FIG. 6 shows an example analyser and example bracket with a microplate in a second orientation.

When the opposition orientation is used, such as that shown in FIG. 4, when applied to a practical example, such as that shown in FIG. 6 the microplate 2 does not fit in the recess of the bay. In FIG. 6, this can be seen at area 6 where a microplate loaded into the bay in the incorrect orientation is shown not to fit in the recess. Typically this incorrect loading would prohibit the analyser 1 from working.

If a microplate is used with a chamfered side located on a different corner of the microplate relative to the desired orientation of the wells to that shown in the figures, the bracket is able to be removed and re-attached to holes on the opposing side of the bay and/or replaced with a mirror image bracket. This allows the same reduction in human error to be achieved with microplates of a different design to the microplate design described herein and as shown in the figures. Various other example brackets that provide the described functionality are able to be provided that provide a complementary shape to an alternate microplate.

While the examples described in relation to the figures describe the bracket as a separate component to the platform, there are examples in which the bracket and platform are the same (unitary) component. This may be a moulded component or a component manufactured by other means.

In some examples where the platform and bracket are not separable components, the base or bar of the bracket may be provided by a portion of the platform. This may be a portion of the bay or recess of the bay or some other part of the platform.

The invention claimed is:

1. A biological sample analyzer comprising:

a platform comprising a sample plate bay in which a sample plate is loadable in use; and a bracket comprising:

a base; and an arm extending from the base and into the sample plate bay of the biological sample analyzer to prohibit access to a portion of the bay.

2. The biological sample analyzer according to claim 1, wherein the arm provides a surface with which orientation markers of a sample plate are able to be aligned when loading the sample plate into the sample plate bay.

3. The biological sample analyzer according to claim 1, wherein the arm includes a section orientated at an angle relative to the base.

4. The biological sample analyzer according to claim 1, further comprising a first transitional surface at a join between a side of the arm and the base.

5. The biological sample analyzer according to claim 4, wherein the first transitional surface is a chamfer.

6. The biological sample analyzer according to claim 1, wherein at least a portion of the arm extends outwardly from the base providing an overhang.

7. The biological sample analyzer according to claim 6, further comprising a second transitional surface at a join between an underside of the overhang and the base.

8. The biological sample analyzer according to claim 7, wherein the second transitional surface is a fillet.

9. The biological sample analyzer according to claim 1, wherein the bracket is made of acetal.

10. The biological sample analyzer bracket according to claim 9, wherein a height of the base is at least 7 millimetres (mm).

11. The biological sample analyzer bracket-according to claim 9, wherein a width of the base is at least 9 mm.

12. The biological sample analyzer according to claim 1, wherein the base has at least one through-bore through which a bolt of the platform is able to pass in use.

13. The biological sample analyzer according to claim 1, wherein the base and the arm are integral to a single piece of material.

14. The biological sample analyzer according to claim 1, wherein the arm extends into a corner of the bay.

15. The biological sample analyzer according to claim 1, wherein there is a void between the arm and a base of the bay.

16. The biological sample analyzer according to claim 1, wherein the base of the bracket is engaged with at least one bolt projecting outwardly from the platform.

17. The biological sample analyzer according to claim 1, wherein the bracket is fixed in place relative to the biological sample analyzer.

* * * * *